United States Patent
Pan

(10) Patent No.: US 11,952,080 B2
(45) Date of Patent: Apr. 9, 2024

(54) BICYCLE DERAILLEUR SYSTEM

(71) Applicant: TIEN HSIN INDUSTRIES CO., LTD., Taichung (TW)

(72) Inventor: Li-Syun Pan, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 148 days.

(21) Appl. No.: 17/842,001

(22) Filed: Jun. 16, 2022

(65) Prior Publication Data
US 2023/0406447 A1    Dec. 21, 2023

(51) Int. Cl.
| | | |
|---|---|---|
| *B62M 9/123* | (2010.01) | |
| *B62J 45/20* | (2020.01) | |
| *B62J 45/40* | (2020.01) | |
| *B62M 9/122* | (2010.01) | |
| *G06V 20/40* | (2022.01) | |
| *B62J 45/415* | (2020.01) | |
| *B62J 45/416* | (2020.01) | |

(52) U.S. Cl.
CPC ............. *B62M 9/123* (2013.01); *B62J 45/20* (2020.02); *B62J 45/40* (2020.02); *B62M 9/122* (2013.01); *G06V 20/48* (2022.01); *B62J 45/415* (2020.02); *B62J 45/416* (2020.02)

(58) Field of Classification Search
None
See application file for complete search history.

(56) References Cited

U.S. PATENT DOCUMENTS

| | | | | |
|---|---|---|---|---|
| 5,433,284 | A * | 7/1995 | Chou | B62M 6/90 |
| | | | | 280/214 |
| 6,774,771 | B2 * | 8/2004 | Takeda | B62M 25/08 |
| | | | | 340/432 |
| 10,119,612 | B2 * | 11/2018 | Zhang | G07C 5/08 |
| 10,155,567 | B2 * | 12/2018 | Sato | B62M 25/08 |
| 10,569,836 | B2 * | 2/2020 | Hamed | B62J 45/20 |
| 10,640,171 | B2 * | 5/2020 | Hamed | B62J 50/22 |
| 11,046,390 | B2 * | 6/2021 | Hamed | B62K 23/06 |

(Continued)

FOREIGN PATENT DOCUMENTS

| | | | | |
|---|---|---|---|---|
| CN | 100404369 C | * | 7/2008 | ............. B62M 25/08 |
| CN | 107128434 A | * | 9/2017 | ............. B62M 25/08 |

(Continued)

*Primary Examiner* — Kevin R Steckbauer
(74) *Attorney, Agent, or Firm* — Apex Juris, pllc; Lynette Wylie

(57) ABSTRACT

A bicycle derailleur system is applied to a bicycle and includes a controller, a camera, a derailleur assembly, and the memory device that are electrically connected to the controller. The camera records a real-time video of a road ahead. When the derailleur assembly is operated to shift, the derailleur assembly sends a chain shifting signal to drive the controller to process the video captured by the camera to obtain a section of video between a predetermined time before and after the chain shifting signal. The controller stores the section of the video along with information in the chain shifting signal to the memory device, to establish a basis for image similarity comparison. When the bicycle derailleur system is operated automatically, the image similarity comparison between real-time video recorded by the camera and the sections of the videos stored in the memory device is conducted to determine whether to shift.

10 Claims, 2 Drawing Sheets

(56) References Cited

U.S. PATENT DOCUMENTS

| | | | |
|---|---|---|---|
| 11,345,441 B2 * | 5/2022 | Hamed | B62M 25/08 |
| 11,479,323 B2 * | 10/2022 | Hamed | B62M 25/02 |
| 11,767,082 B2 * | 9/2023 | Hamed | B62M 9/133 |
| | | | 701/58 |
| 11,794,655 B2 * | 10/2023 | Hamano | G08G 1/168 |
| 2003/0071437 A1 * | 4/2003 | Takeda | B62M 25/08 |
| | | | 280/260 |
| 2016/0096589 A1 * | 4/2016 | Sato | B62M 9/122 |
| | | | 474/70 |
| 2017/0051828 A1 * | 2/2017 | Zhang | B62J 45/412 |
| 2018/0208269 A1 * | 7/2018 | Nose | B62K 25/08 |
| 2019/0249769 A1 * | 8/2019 | Hamed | F16H 63/42 |
| 2019/0263474 A1 * | 8/2019 | Hamed | B62M 9/127 |
| 2020/0216144 A1 * | 7/2020 | Hamed | B62K 23/06 |
| 2021/0331767 A1 * | 10/2021 | Hamed | B62M 9/122 |
| 2022/0119075 A1 * | 4/2022 | Hamed | B62M 9/122 |
| 2022/0254165 A1 * | 8/2022 | Yokota | H04L 7/00 |
| 2022/0388603 A1 * | 12/2022 | Hahn | B62M 25/08 |
| 2023/0011130 A1 * | 1/2023 | Fukasawa | B60W 40/072 |
| 2023/0014867 A1 * | 1/2023 | Hamed | B62J 45/412 |
| 2023/0278666 A1 * | 9/2023 | Hamed | B62J 45/00 |
| | | | 474/80 |
| 2023/0365225 A1 * | 11/2023 | Hamed | B62J 45/00 |
| 2023/0406447 A1 * | 12/2023 | Pan | B62M 9/123 |

FOREIGN PATENT DOCUMENTS

| | | | | |
|---|---|---|---|---|
| CN | 107235111 A | * | 10/2017 | B62M 25/08 |
| CN | 107235111 B | * | 4/2019 | B62M 25/08 |
| CN | 107128434 B | * | 5/2019 | B62M 25/08 |
| CN | 107792074 B | * | 6/2020 | B60W 10/10 |
| CN | 217260538 U | * | 8/2022 | |
| DE | 102017221560 A1 | * | 7/2018 | B62J 45/41 |
| DE | 112020005315 T5 | * | 10/2022 | B60W 30/04 |
| EP | 1304286 A2 | * | 4/2003 | B62M 25/08 |
| EP | 3133541 A1 | * | 2/2017 | B62J 45/10 |
| EP | 4098533 A1 | * | 12/2022 | B62J 45/41 |
| GB | 2293801 A | * | 4/1996 | B62M 6/45 |
| JP | 7173373 B2 | * | 11/2022 | B60W 40/11 |
| JP | 7366157 B2 | * | 10/2023 | B60W 30/04 |
| TW | 202330353 A | * | 8/2023 | B62J 45/41 |
| WO | WO-2021084896 A1 | * | 5/2021 | B60W 40/11 |
| WO | WO-2021149403 A1 | * | 7/2021 | B60W 30/04 |

\* cited by examiner

BICYCLE DERAILLEUR SYSTEM

BACKGROUND OF THE INVENTION

Technical Field

The present disclosure relates generally to a bicycle derailleur system, and more particularly to a bicycle derailleur system that could automatically shift.

Description of Related Art

Nowadays, when the rider rides the bicycle, the rider will change speed through a derailleur assembly on different paths, such as uphill path, downhill path, and a smooth path, to save energy and enhance a riding performance.

Although there is an electronic shifting system for the derailleur assembly, the rider still needs to manually operate the derailleur assembly to shift the chain, which may distract the attention of the rider. Additionally, since the derailleur assembly is manually operated, the rider is unable to operate the chain shifting as that in the previous journey on the same path.

BRIEF SUMMARY OF THE INVENTION

In view of the above, the primary objective of the present disclosure is to provide a bicycle derailleur system that could automatically operate a derailleur assembly of a bicycle to shift a chain of the bicycle. When the rider rides the bicycle and manually operates the derailleur assembly, the bicycle derailleur system collects chain shifting data that include a video before and after the chain shifting and information of the sprockets, which the chain is shifted onto, to generate a basis of an image similarity comparison for determining whether to shift or not in the future.

The present disclosure provides a bicycle derailleur system adapted to be mounted to a bicycle, wherein the bicycle derailleur system includes a controller, a camera, a derailleur assembly, and a memory device. The camera is electrically connected to the controller and is adapted to capture a video in a moving direction of the bicycle. The derailleur assembly is electrically connected to the controller and is adapted to output a chain shifting signal to the controller for shifting a chain of the bicycle to a desired one of sprockets, wherein the chain shifting signal includes an information of the desired one of the sprockets of the bicycle. The memory device is electrically connected to the controller. When the controller receives the chain shifting signal, the controller processes the video captured by the camera to obtain a section of the video from a first predetermined time before the chain shifting signal is received to the second predetermined time after the chain shifting signal is received and stores the section of the video along with the information of the desired one of the sprockets into the memory device.

With such design, the chain shifting data collected during the derailleur assembly of the bicycle is manually operated by the rider could be analyzed by the machine learning algorithms to optimize the timing of the chain shifting and improve the basis for the image similarity comparison. When the rider rides the bicycle on the same path again, the controller controls the derailleur assembly to automatically shift the chain according to the result of the image similarity comparison to repeat the operation of the chain shifting in the previous journey on the same path.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
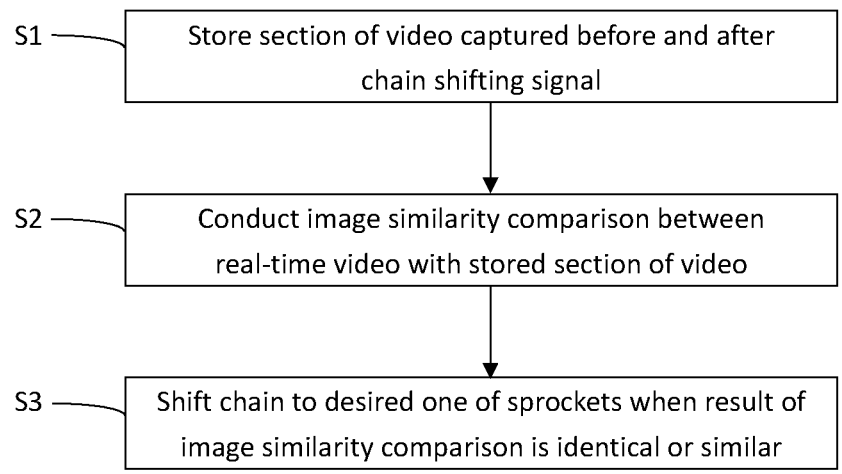
FIG. 1 is a flowchart showing an operation of the bicycle derailleur system of an embodiment according to the present disclosure.
Figure 2:
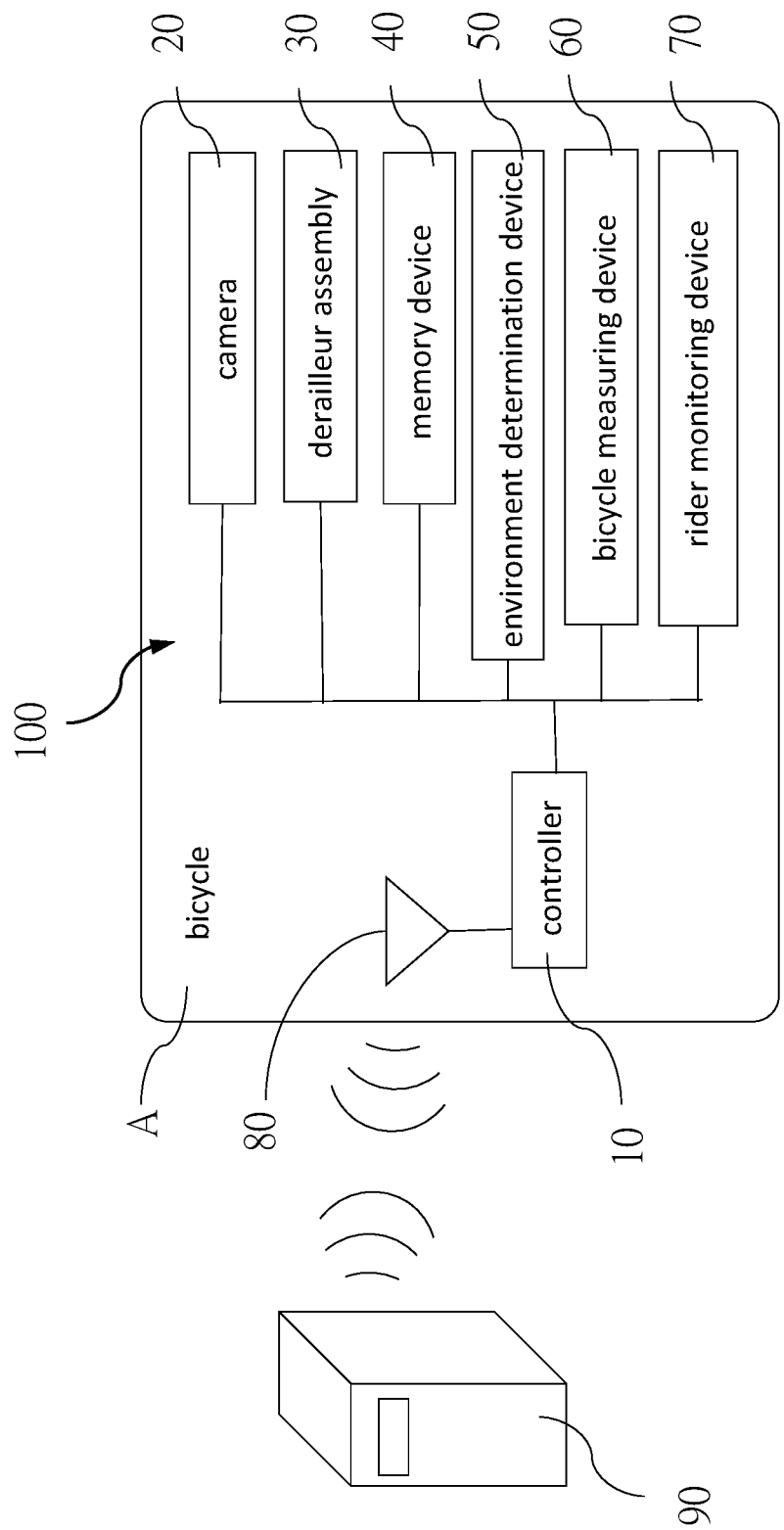
FIG. 2 is a block diagram of the bicycle derailleur system of the embodiment according to the present disclosure.

As illustrated in FIG. 1 to FIG. 2, a bicycle derailleur system 100 of an embodiment according to the present disclosure is adapted to be mounted to a bicycle A and includes controller 10, a camera 20, a derailleur assembly 30, and a memory device 40, wherein the controller 10 is electrically connected to the camera 20, the derailleur assembly 30, and the memory device 40.

The camera 20 is adapted to capture a video in a moving direction of the bicycle A, namely recording a real-time view of a road ahead. The video that is captured is temporarily and circularly stored in either a built-in memory or the memory device 40. The derailleur assembly 30 could be operated by a rider of the bicycle A to shift a chain of the bicycle A to desired one of sprockets. When the derailleur assembly 30 is operated to shift the chain of the bicycles by the rider, the derailleur assembly 30 outputs a chain shifting signal to the controller 10. Alternatively, the derailleur assembly 30 could shift the chain of the bicycle A according to a command that is transmitted from the controller 10. When the controller 10 receives the chain shifting signal transmitted by the derailleur assembly 30, the controller 10 retrieves a section of the video captured by the camera 20 and stores the section of the video along with information in the chain shifting signal as a chain shifting datum into the memory device 40. The section of the video includes a video that is captured from a first predetermined time before the chain shifting signal to a second predetermined time after the chain shifting signal by the camera 20. The information in the chain shifting signal includes an information of the desired one of the sprockets.

For enabling the bicycle derailleur system 100 to automatically conduct chain shifting, the rider needs to ride the bicycle A on the same path and manually operate the derailleur assembly 30 several times to allow the camera 20 to capture various videos of the same path and the controller 10 to collect multiple chain shifting data to establish a chain-shifting database in the memory device 40. The various video of the same path and the multiple chain shifting data could be analyzed by using the machine learning algorithm to optimize a timing of chain shifting and improve a basis of an image similarity comparison, which will be described later.

Furthermore, when the derailleur assembly 30 needs to be automatically operated, for example, the derailleur assembly 30 is in an automatic shifting mode or a semiautomatic shifting mode, a real-time video captured by the camera 20 is compared with the sections of the videos stored in the memory device 40 to automatically determine one of the sprockets, which the chain is about to be shifted onto by the derailleur assembly 30. An operating process of the bicycle derailleur system 100 includes steps shown in FIG. 1, wherein the steps are described below.

Step S01: Store the sections of the videos captured before and after the chain shifting signal. When the rider of the bicycle A operates the derailleur assembly 30 to shift the chain of the bicycle A to the desired one of the sprockets, the derailleur assembly 30 outputs the chain shifting signal to the controller 10, wherein the chain shifting signal includes information of the desired one of the sprockets. The controller 10 could control the derailleur assembly 30 to shift the chain to the desired one of the sprockets and obtain the information of the desired one of the sprockets and time from the chain shifting signal or during communication with the derailleur assembly 30. When the controller 10 receives the chain shifting signal outputted by the derailleur assembly 30, the controller 10 processes the video captured by the camera 20 to obtain the section of the video from the first predetermined time before the chain shifting signal to the second predetermined time after the chain shifting signal and stores the section of the video along with the information of the desired one of the sprockets of the chain shifting signal into the memory device 40. In an embodiment, the first predetermined time is equal to the second predetermined time, and the first predetermined time and the second predetermined time could be set in a range of zero seconds to several seconds. When the first predetermined time and the second predetermined time are set to be zero seconds, the section of the video is an image that is captured at a moment when the chain shifting signal is received by the controller 10.

Step S02: Conduct the image similarity comparison between the real-time video with the stored sections of the videos. When the bicycle A is moving along the path, the controller 10 compares the real-time video captured by the camera 20 with the sections of the videos stored in the memory device 40 to determine whether the real-time video is similar or identical to any one of the sections of the videos.

Step S03: Shift the chain to the desired one of the sprockets. When the real-time video is similar or identical to one of the sections of the videos, the controller 10 controls the derailleur assembly 30 to operate according to the information of the desired one of the sprockets that corresponds to the identical or similar one of the sections of the videos, thereby either shifting the chain of the bicycle A to the desired one of the sprockets or keeping the chain of the bicycle A from shifting (when the chain of the bicycle A is located onto the desired one of the sprockets.) As a result, when the bicycle A that is mounted with the bicycle derailleur system 100 is ridden by a rider on the same path again, the bicycle derailleur system 100 could automatically shift the chain of the bicycle A just like the chain of the bicycle A is manually shifted by the rider at a previous journey of the same path. Each of the locations on the same path where the chain of the bicycle A is automatically shifted is identical to one of the locations on the path where the chain of the bicycle A is manually shifted during the previous journey of the same path. Additionally, when the chain shifting data are accumulated, the controller 10 could analyze the chain-shifting data by the machine learning algorithms to optimize the timing of the automatic shifting process and the selection of the desired one of the sprockets to generate a better basis for the image similarity comparison, thereby enhancing the performance of the rider on the same path.

The image similarity comparison is conducted by using known image similarity algorithms, such as a hash algorithm and a deep learning algorithm. A process of the image similarity comparison includes steps, including a feature extraction, a fingerprint generalization, a similarity comparison, and so on, to determine whether a real-time video is identical or similar to any one of the sections of the videos stored in the memory device. When a similarity value is within a predetermined range, the result of the image similarity comparison is defined to be similar.

In the current embodiment, the bicycle derailleur system 100 could further include an environment determination device 50, a bicycle measuring device 60, and a rider monitoring device 70, wherein the environment determination device 50, the bicycle measuring device 60, and the rider monitoring device 70 are electrically connected to the controller 10.

The environment determination device 50 is adapted to determine parameters of an environmental condition, and the controller 10 stores the parameters of the environmental condition at the moment when the chain shifting signal is received by the controller 10 into the memory device 40, wherein the parameters of the environmental condition include a GPS location positioned by a GPS locator, a slope measured by a slope sensor, an altitude measured by an altimeter, and so on. The bicycle measuring device 60 is adapted to measure parameters of the bicycle A, and the controller 10 stores the parameters of the bicycle A at the moment when the chain shifting signal is received by the controller 10 into the memory device 40, wherein the parameters of the bicycle A include a wheel speed, a crank shaft speed, a crank torque, a tilt angle of the bicycle A, or a pedal power that are measured by any of a tachometer, a strain gauge, a gyroscope, and a power meter. The rider monitoring device 70 is adapted to monitor physical parameters of the rider, and the controller 10 stores the physical parameters of the rider at the moment when the chain shifting signal is received by the controller 10 into the memory device 40, wherein the physical parameters include a heartbeat and a respiratory rate of the rider that are measured by a heartbeat sensor and a respiratory rate sensor.

When the step S02 is conducted, except for comparing the real-time video captured by the camera 20 with the stored section of the video in the memory device 40, the controller 10 could optionally compare real-time parameters of the environmental condition determined by the environment determination device 50, real-time parameters of the bicycle measured by the bicycle measuring device 60, and real-time physical parameters of the rider measured by the rider monitoring device 70 with the parameters of the environmental condition, the parameters of the bicycle A, and the physical parameters of the rider stored in the memory device 40, respectively. When a result of the image similarity comparison is identical or similar, and results of the optional comparisons of the parameters of the environmental condition, the parameters of the bicycle, and the physical parameters of the rider are identical and similar, the derailleur assembly 30 is controlled to shift the chain according to the information of the desired one of the sprockets corresponding to the section of the image that is similar or identical to the real-time video. When the differences between the real-time parameters and the stored parameters are within a predetermined range, the results of the comparisons of the parameters of the environmental condition, the parameters of the bicycle, and the physical parameters of the rider are defined to be identical and similar.

After the data of the image and the parameter are accumulated more and more, the bicycle derailleur system 100 could be optimized by machine learning. A means of transmitting the data of the bicycle derailleur system 100 is to dispose a transmitting device 80 in the controller 10. In the current embodiment, the transmitting device 80 is a wireless transmission device 80. In other embodiments, the transmitting device 80 could be a wire transmission interface, such as a USB transmission interface. Alternatively, the transmitting device 80 is in communication with the memory device 40. Data stored in the memory device 40 could be transmitted to a server 90, wherein the data stored in the memory device 40 includes the sections of the videos, the information of the desired one of the sprockets corresponding to each of the sections of the videos, the parameters of the environmental condition, the parameters of the bicycle, and the physical parameters of the rider that are measured at the time that the chain is shifted. The server 90 analyzes the data including the sections of the videos and the parameters by using a deep learning algorithm to improve the accuracy of the timing of the automatic chain shifting. When an error rate of a machine learning model is greater than a predetermined value, such as 5%, the server 90 analyzes the data including the sections of the video and the parameters again by using other deep learning algorithms. After the analysis of the server 90 is completed, the sections of the videos, the information of the desired one of the sprockets corresponding to each of the sections of the videos, and the parameters corresponding to each of the sections of the videos, are selected by the server 90 and are transmitted back to the memory device 40 via the transmitting device 80 to be used as the better basis of the image similarity comparison and the comparison of the parameter, thereby controlling the derailleur assembly 30 to shift the chain accurately.

An operation of the bicycle derailleur system 100 has a manual shifting mode, the semiautomatic shifting mode, and the automatic shifting mode. During the step S01, the bicycle derailleur system 100 is in the manual shifting mode. At the time, the derailleur assembly 30 is operated by the rider to shift the chain of the bicycle A. When the bicycle A in the manual shifting mode is repeatedly ridden on the same path, the chain shifting data could be collected from every chain shift, thereby accumulating the sections of the videos, the information of the desired one of the sprockets corresponding to each of the sections of the videos, and the information of the parameters corresponding to each of the sections of the videos.

When the bicycle derailleur system 100 conducts the step S02 and the step S03, the bicycle derailleur system 100 is in either the semiautomatic shifting mode or the automatic shifting mode. The difference between the semiautomatic shifting mode and the automatic shifting mode is whether the rider could interfere with the automatic chain shifting or not. When the bicycle derailleur system 100 is in the semiautomatic shifting mode, the rider could interfere with the automatic chain shifting by manually operating the derailleur assembly 30. When the bicycle derailleur system 100 is in the automatic shifting mode, the derailleur assembly 30 is completely controlled by the controller 10 and completely based on the result of the video similarity comparison.

More specifically, the derailleur assembly 30 includes an operating portion and a derailleur, wherein the operating portion is provided to be operated by the rider to shift the chain, and the derailleur is adapted to shift the chain to the desired one of the sprockets. In the current embodiment, when the operating portion of the derailleur assembly 30 is operated, the chain shifting signal is transmitted to the controller 10 from the derailleur assembly 30, and then the controller 10 controls the derailleur of the derailleur assembly 30 to shift the chain. Alternatively, in another embodiment, the derailleur of the derailleur assembly 30 could be directly controlled by both the operating portion of the derailleur assembly 30 and the controller 10 to shift the chain.

It must be pointed out that the embodiment described above is only a preferred embodiment of the present disclosure. All equivalent structures and methods which employ the concepts disclosed in this specification and the appended claims should fall within the scope of the present disclosure.

What is claimed is:

1. A bicycle derailleur system adapted to be mounted to a bicycle, comprising:
   a controller;
   a camera electrically connected to the controller and adapted to capture a video along a moving direction of the bicycle;
   a derailleur assembly electrically connected to the controller and adapted to output a chain shifting signal to the controller to shift a chain of the bicycle to a desired one of sprockets, wherein the chain shifting signal comprises an information of the desired one of the sprockets of the bicycle; and
   a memory device electrically connected to the controller;
   wherein when the controller receives the chain shifting signal, the controller processes the video captured by the camera to obtain a section of the video from a first predetermined time before the chain shifting signal is received to the second predetermined time after the chain shifting signal is received and stores the section of the video along with the information of the desired one of the sprockets into the memory device.

2. The bicycle derailleur system as claimed in claim 1, comprising an environment determination device, wherein the environment determination device is electrically connected to the controller and is adapted to determine at least one parameter of an environmental condition; the controller stores the at least one parameter of the environmental condition at a moment when the chain shifting signal is received by the controller into the memory device.

3. The bicycle derailleur system as claimed in claim 2, wherein the at least one parameter of the environmental condition comprises a GPS location, a slope, or an altitude.

4. The bicycle derailleur system as claimed in claim 1, comprising a bicycle measuring device, wherein the bicycle measuring device is electrically connected to the controller and is adapted to measure at least one parameter of the bicycle; the controller stores the at least one parameter of the bicycle at a moment when the chain shifting signal is received by the controller into the memory device.

5. The bicycle derailleur system as claimed in claim 4, wherein the at least one parameter of the bicycle comprises a wheel speed, a crank shaft speed, a crank torque, a tilt angle of the bicycle, or a pedal power.

6. The bicycle derailleur system as claimed in claim 1, comprising a rider monitoring device, wherein the rider monitoring device is electrically connected to the controller and is adapted to monitor at least one physical parameter of a rider; the controller stores the at least one physical parameter of the rider at a moment when the chain shifting signal is received by the controller into the memory device.

7. The bicycle derailleur system as claimed in claim 6, wherein the at least one physical parameter of the rider comprises a heartbeat or a respiratory rate of the rider.

8. The bicycle derailleur system as claimed in claim 1, comprising a transmitting device, wherein the transmitting device is in communication with the memory device and transmits data that are stored in the memory device to a server.

9. The bicycle derailleur system as claimed in claim 1, wherein the controller compares a video captured at real time by the camera with the section of the video stored in the memory device; when a result of an image similarity comparison is identical or similar, the derailleur assembly is controlled to shift the chain according to the information of the desired one of the sprockets, which corresponds to the section of the video that is similar or identical to the real-time video.

10. The bicycle derailleur system as claimed in claim 2, wherein the controller compares a video captured at real time by the camera with the section of the video stored in the memory device and simultaneously compares parameter of the environmental condition determined at real time by the environment determination device with the parameter of the environmental condition stored in the memory device; when a result of an image similarity comparison and a result of a parameter comparison are identical or similar, the derailleur assembly is controlled to shift the chain according to the information of the desired one of the sprockets, which corresponds to the section of the video that is similar or identical to the real-time video.

* * * * *